United States Patent
Wang et al.

(10) Patent No.: US 7,829,901 B2
(45) Date of Patent: Nov. 9, 2010

(54) LED CHIP PACKAGE STRUCTURE WITH HIGH-EFFICIENCY LIGHT-EMITTING EFFECT AND METHOD FOR MAKING THE SAME

(75) Inventors: Bily Wang, Hsinchu (TW); Shih-Yu Wu, Banciao (TW); Wen-Kuei Wu, Hukou Township, Hsinchu County (TW)

(73) Assignee: Harvatek Corporation, Hsinchu (TW)

( * ) Notice: Subject to any disclaimer, the term of this patent is extended or adjusted under 35 U.S.C. 154(b) by 0 days.

(21) Appl. No.: 12/285,034

(22) Filed: Sep. 29, 2008

(65) Prior Publication Data

US 2009/0146156 A1  Jun. 11, 2009

(30) Foreign Application Priority Data

Dec. 10, 2007  (TW) .............................. 96147090 A

(51) Int. Cl.
*H01L 33/00* (2010.01)
*H01L 21/00* (2006.01)

(52) U.S. Cl. .............................. 257/88; 257/91; 257/99; 257/E33.001; 257/E21.001; 438/28

(58) Field of Classification Search .................. 257/88, 257/91, 99, 100, E33.001, E21.001, E25.02, 257/E33.05, E33.07; 438/28, 26, 29
See application file for complete search history.

(56) References Cited

U.S. PATENT DOCUMENTS

| 6,921,926 | B2 * | 7/2005 | Hsu | 257/98 |
|---|---|---|---|---|
| 2004/0061433 | A1 * | 4/2004 | Izuno et al. | 313/498 |
| 2006/0138436 | A1 * | 6/2006 | Chen et al. | 257/98 |
| 2006/0157724 | A1 * | 7/2006 | Fujita | 257/99 |
| 2009/0128732 | A1 * | 5/2009 | Hamada | 349/58 |

* cited by examiner

*Primary Examiner*—Victor A Mandala
*Assistant Examiner*—Whitney Moore
(74) *Attorney, Agent, or Firm*—Rosenberg, Klein & Lee

(57) ABSTRACT

An LED chip package structure with high-efficiency light-emitting effect includes a substrate unit, a light-emitting unit, a package colloid unit, and a frame unit. The light-emitting unit has a plurality of LED chips electrically arranged on the substrate unit. The package colloid unit has a longitudinal package colloid covering the LED chips, and the longitudinal package colloid has a cambered colloid surface and a light-emitting colloid surface respectively formed on its top surface and a lateral surface thereof. The frame unit that is a frame layer covering the substrate unit and disposed around a lateral side of the longitudinal package colloid for exposing the light-emitting colloid surface of the longitudinal package colloid.

14 Claims, 12 Drawing Sheets

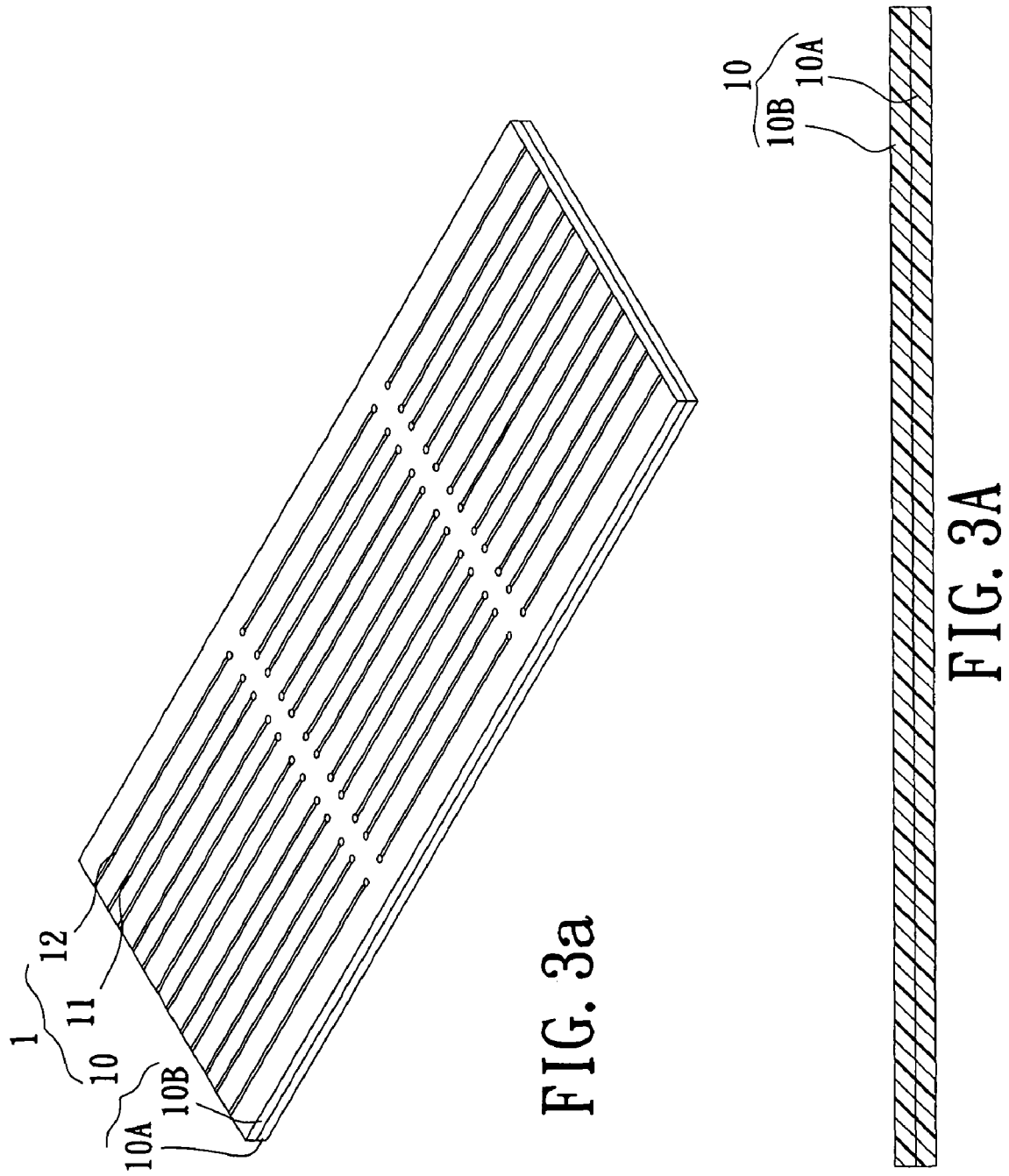

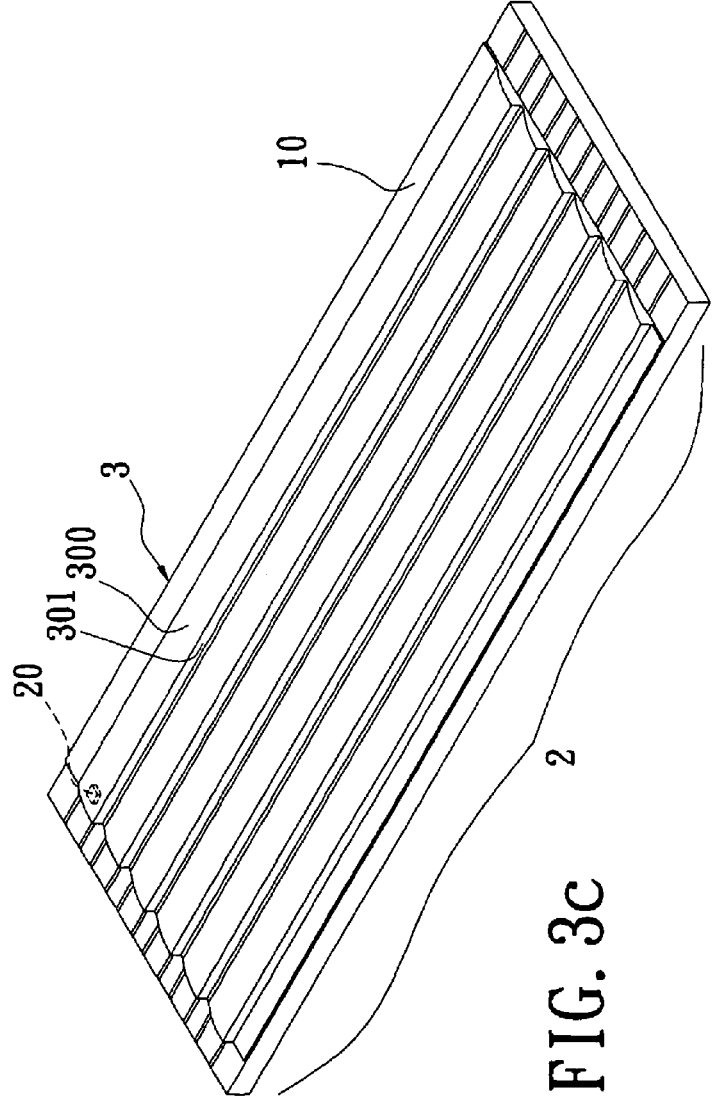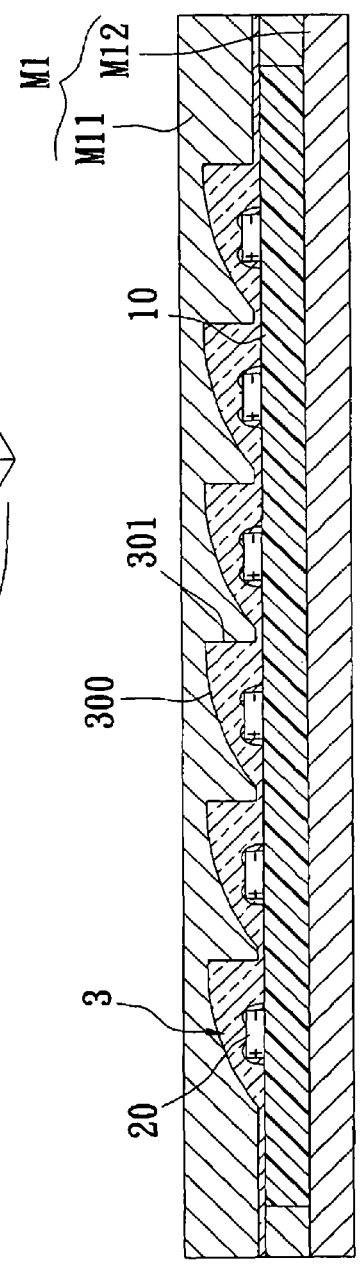
FIG. 3c
FIG. 3C

LED CHIP PACKAGE STRUCTURE WITH HIGH-EFFICIENCY LIGHT-EMITTING EFFECT AND METHOD FOR MAKING THE SAME

BACKGROUND OF THE INVENTION

1. Field of the Invention

The present invention relates to an LED chip package structure and a method for making the same, and particularly relates to an LED chip package structure with high-efficiency light-emitting effect and a method for making the same.

2. Description of the Related Art

Referring to FIG. 1, a method for packaging LED chips according to the prior art is shown. The method includes: providing a plurality of packaged LEDs that have been packaged (S800); providing a longitudinal substrate body that has a positive electrode trace and a negative electrode trace (S802); and then, arranging each packaged LED on the longitudinal substrate body in sequence and electrically connecting a positive electrode side and a negative electrode side of each packaged LED with the positive electrode trace and the negative electrode trace of the substrate body (S804).

However, with regard to the method of the prior art, each packaged LED needs to be firstly cut from an entire LED package structure, and then each packaged LED is arranged on the longitudinal substrate body via SMT process. Hence, the known making process is time-consuming. Moreover, because the fluorescent colloids 4a are separated from each other, a dark band is easily produced between the two fluorescent colloids 4a and the two LEDs 2a. Hence, the known LED package structure does not offer a good display for users. Moreover, because the package colloids of the packaged LEDs are separated from each other, a dark band is easily produced between each two package colloids and each two packaged LEDs. Hence, the known LED package structure does not offer a good display for users.

Referring to FIG. 2, an LED chip D is used to generate lateral projected light as a lateral light source that is applied to a light-guiding board M of a monitor of a notebook. Because the light-guiding board M of the monitor is very thin, a length 11 of a base S1 needs to be shortened. In other words, the length 11 of the base S1 is very short, the LED chip D can not get good heat-dissipating effect (the length 11 of the base S1 is limited by the thickness of light-guiding board M). Hence, the LED chip D is damaged easily due to overheat.

SUMMARY OF THE INVENTION

One particular aspect of the present invention is to provide an LED chip package structure with high-efficiency light-emitting effect and a method for making the same. When the LED chip package structure of the present invention lights up, the LED chip package structure generates a series of light-generating areas on a colloid unit. Because the series of light-generating areas is continuous, no dark bands are produced between each two LED chips and no light decay in the present invention. Furthermore, because the LED chips are arranged on a substrate body via an adhesive or a hot pressing method, the process for the LED chip package structure is simple and less time is needed for the manufacturing process. Furthermore, the LED chip package structure can be applied to any type of light source such as a back light module, a decorative lamp, a lighting lamp, or a scanner.

Moreover, the LED chip package structure of the present invention can be used in vertical state due to the special hot pressing method. Hence, the LED chip package structure of the present invention not only has a good heat-dissipating effect, but also can be applied to a thin casing.

In order to achieve the above-mentioned aspects, the present invention provides a method for making an LED chip package structure with high-efficiency light-emitting effect, including: providing a substrate unit; electrically arranging a plurality of LED chips on the substrate unit via a matrix method to form a plurality of transverse LED chip rows; and longitudinally covering the transverse LED chip rows with a package colloid using a first mold unit, and the package colloid having a plurality of cambered colloid surfaces that are formed on its top side and correspond to the transverse LED chip rows.

The method further includes: transversely cutting the package colloid along a line between each two adjacent and longitudinal LED chips to form a plurality of longitudinal package colloids that are separated from each other and respectively covering the transverse LED chip rows, and the top surface of each longitudinal package colloid being the cambered colloid surface and each longitudinal package colloid having a light-emitting colloid surface formed in front of its cambered colloid surface; respectively covering and filling a frame unit on the substrate unit, on the longitudinal package colloids, and between each two adjacent longitudinal package colloids using a second mold unit; and transversely cutting the frame unit and the substrate unit along the line between each two adjacent and longitudinal LED chips to form a plurality of light bars, and each light bar having a frame layer for exposing the light-emitting colloid surfaces of the longitudinal package colloids.

In order to achieve the above-mentioned aspects, the present invention provides a method for making an LED chip package structure with high-efficiency light-emitting effect, including: providing a substrate unit; electrically arranging a plurality of LED chips on the substrate unit via a matrix method to form a plurality of transverse LED chip rows; and transversely covering a plurality of longitudinal package colloids on the transverse LED chip rows using a first mold unit, each longitudinal package colloid having a cambered colloid surface formed on its top side and having a light-emitting colloid surface formed on a lateral surface thereof and in front of its cambered colloid surface.

The method further includes: respectively covering and filling a frame unit on the substrate unit, on the longitudinal package colloids, and between each two adjacent longitudinal package colloids using a second mold unit; and transversely cutting the frame unit and the substrate unit along the line between each two adjacent and longitudinal LED chips to form a plurality of light bars, and each light bar having a frame layer for exposing the light-emitting colloid surfaces of the longitudinal package colloids.

In order to achieve the above-mentioned aspects, the present invention provides an LED chip package structure with high-efficiency light-emitting effect, including: a substrate unit, a light-emitting unit, a package colloid unit, and a frame unit.

The light-emitting unit has a plurality of LED chips electrically arranged on the substrate unit. The package colloid unit has a longitudinal package colloid covering the LED chips, and the longitudinal package colloid has a cambered colloid surface and a light-emitting colloid surface respectively formed on its top surface and a lateral surface thereof. The frame unit that is a frame layer covering the substrate unit and disposed around a lateral side of the longitudinal package colloid for exposing the light-emitting colloid surface of the longitudinal package colloid.

Therefore, because the series of light-generating areas is continuous, no dark bands are produced between each two LED chips and no light decay in the present invention. Furthermore, because the LED chips are arranged on a substrate body via an adhesive or a hot pressing method, the process for the LED chip package structure is simple and less time is needed for the manufacturing process. Moreover, the LED chip package structure of the present can be used in vertical state due to the special hot pressing method. Hence, the LED chip package structure of the present invention not only has a good heat-dissipating effect, but also can be applied to a thin casing.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which:

FIGS. 3a to 3f are perspective, schematic diagrams of a making process according to the first embodiment of present invention, respectively;

FIGS. 3A to 3F are cross-sectional diagrams of a making process according to the first embodiment of present invention, respectively;

FIG. 6A is a partial, cross-sectional diagrams of a making process according to the second embodiment of present invention.

DETAILED DESCRIPTION OF PREFERRED BEST MOLDS

Referring to FIGS. 3, 3a to 3f, and 3A to 3F, the first embodiment of the present invention provides a method for making an LED chip package structure with high-efficiency light-emitting effect.

The method includes: referring to FIGS. 3a and 3A, providing a substrate unit 1, the substrate unit having a substrate body 10, and a positive electrode trace 11 and a negative electrode trace 12 respectively formed on the substrate body 10 (S100).

The substrate body 10 has a metal layer 10A and a Bakelite layer 10B formed on the metal layer 10A (as shown in FIGS. 3a, 3A). In addition, the substrate unit 1 can be a PCB (Printed Circuit Board), a flexible substrate, an aluminum substrate, a ceramic substrate, or a copper substrate. In addition, both the positive electrode trace 11 and the negative electrode trace 12 can be aluminum circuits or silver circuits. The layouts of the positive electrode trace 11 and the negative electrode trace 12 are determined by different needs.

Figure 1:
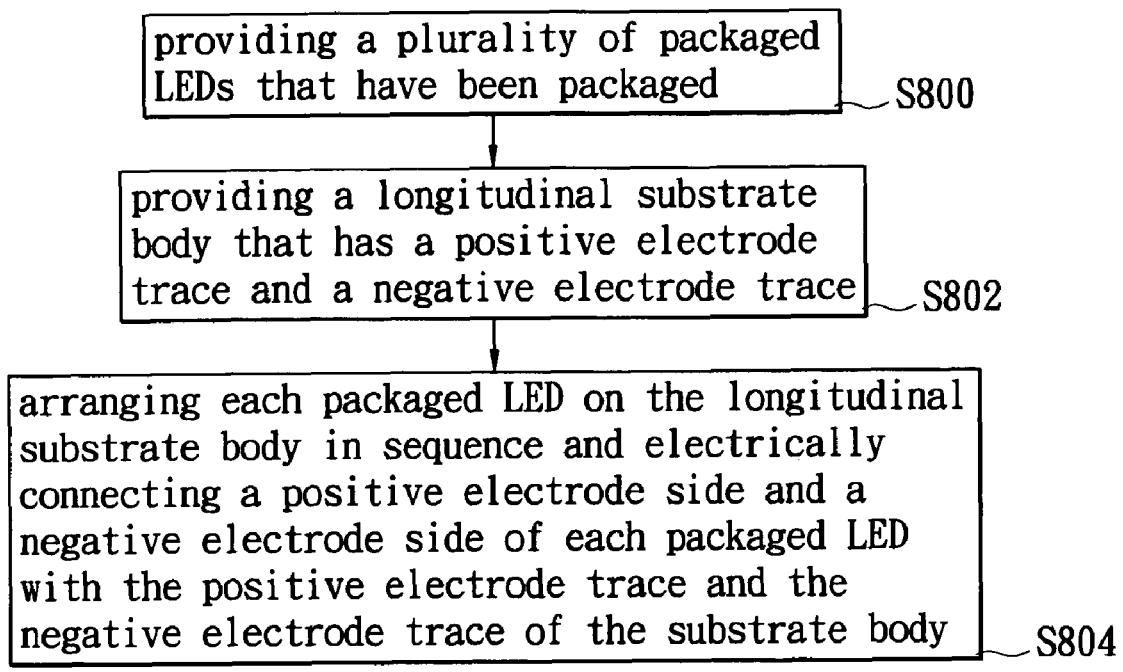
FIG. 1 is a flowchart of a method for packaging LED chips of the prior art.
Figure 2:
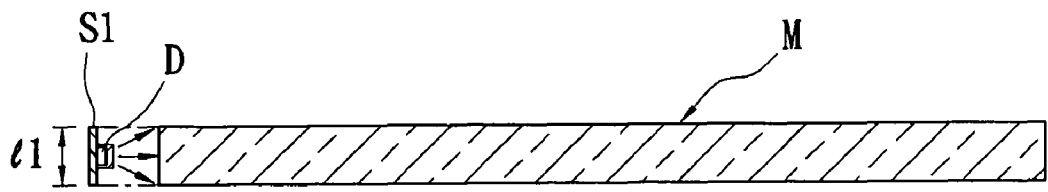
FIG. 2 is a schematic view of an LED chip package structure used to generate lateral projected light according to the prior art.
Figure 3:
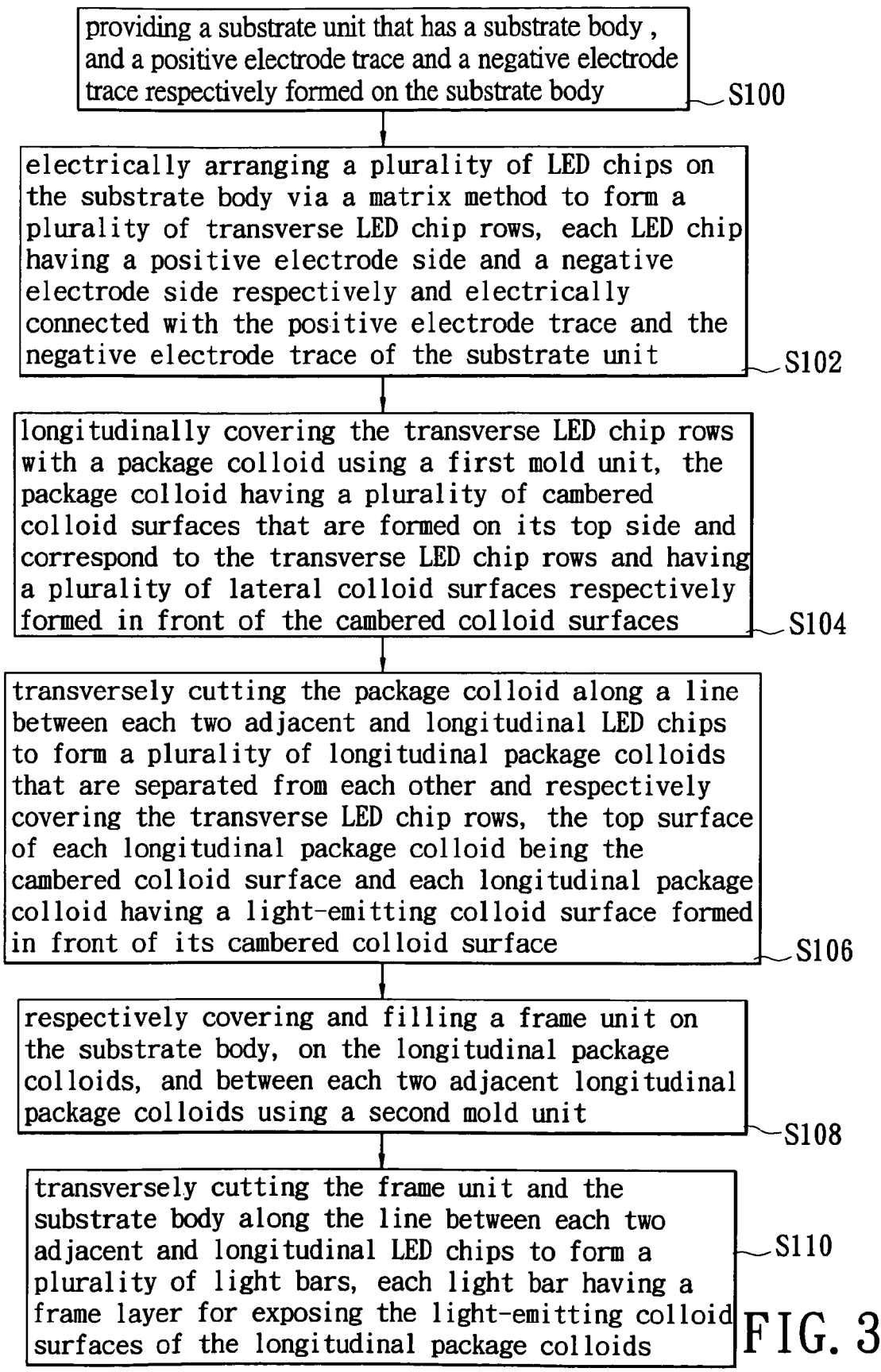
FIG. 3 is a flowchart of a method for making an LED chip package structure according to the first embodiment of present invention.
Figure 3B:
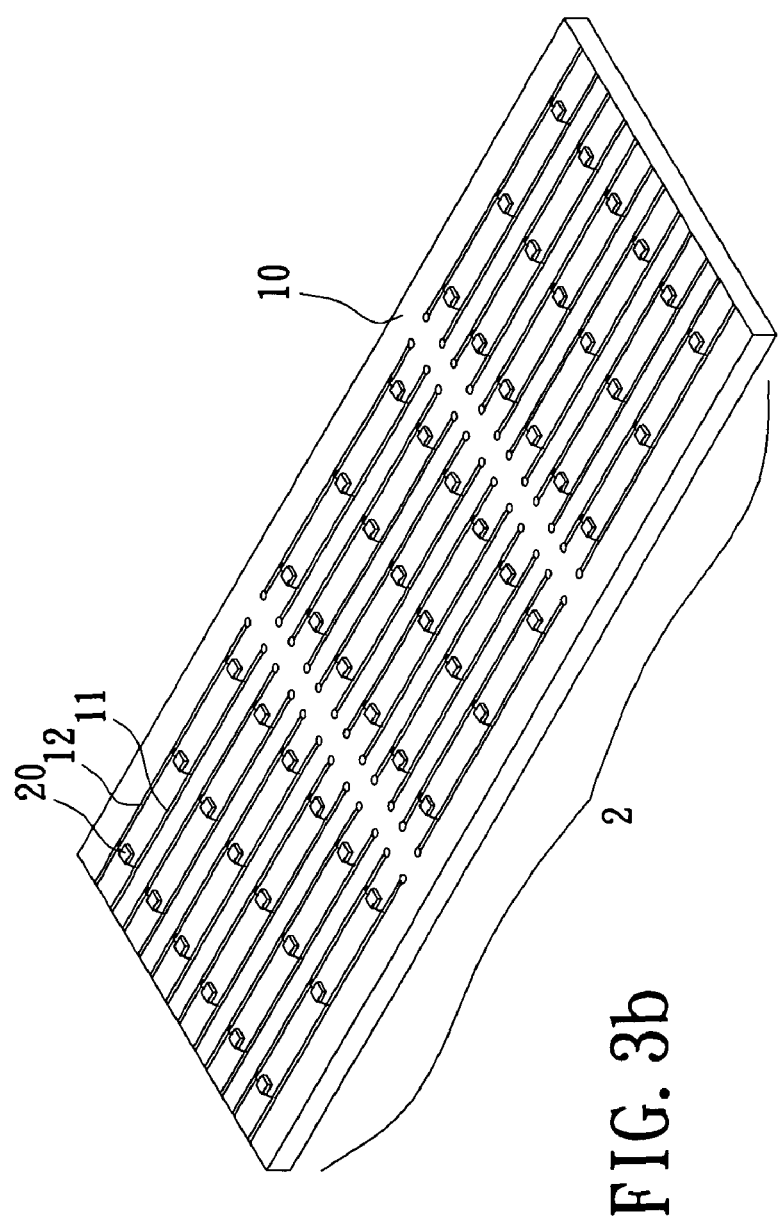
Figure 3B:
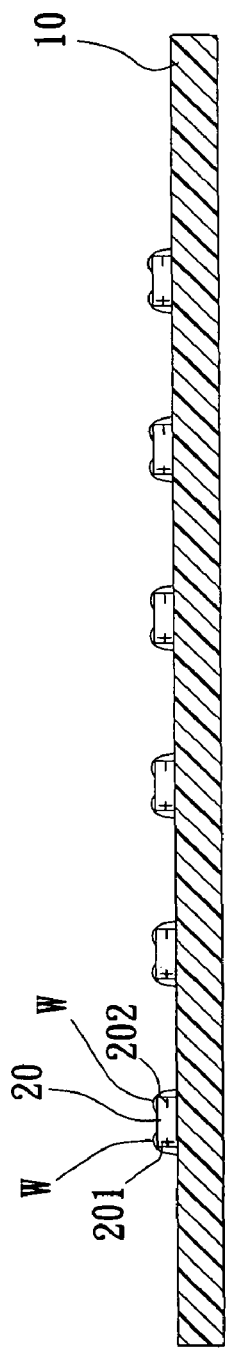

Referring to FIGS. 3b and 3B, the method of the first embodiment further includes: electrically arranging a plurality of LED chips 20 on the substrate body 10 via a matrix method to form a plurality of transverse LED chip rows 2, each LED chip 20 having a positive electrode side 201 and a negative electrode side 202 respectively and electrically connected with the positive electrode trace 11 and the negative electrode trace 12 of the substrate unit 1 (S102).

In the first embodiment, the positive electrode side 201 and the negative electrode side 202 of each LED chip 20 are respectively and electrically connected with the positive electrode trace 11 and the negative electrode trace 12 of the substrate unit 1 via two corresponding leading wires W via a wire-bounding method. Moreover, each transverse LED chip row 2 is straightly arranged on the substrate body 10 of the substrate unit 1 in a straight line. Each LED chip 20 can be a blue LED chip.

However, the above-mentioned method of electrically connecting the LED chips should not be used to limit the present invention. For example, referring to FIG. 5, the positive electrode side 201' and the negative electrode side 202' of each LED chip 20' respectively and electrically connected with the positive electrode trace 11' and the negative electrode trace 12' of the substrate unit 1' via a plurality of corresponding solder balls B via a flip-chip method. Moreover, according to different needs, positive electrode sides and negative electrode sides of LED chips (not shown) can be electrically connected to a positive electrode trace and a negative electrode trace of a substrate unit (not shown) via parallel, serial, or parallel and serial method.

Figure 5:
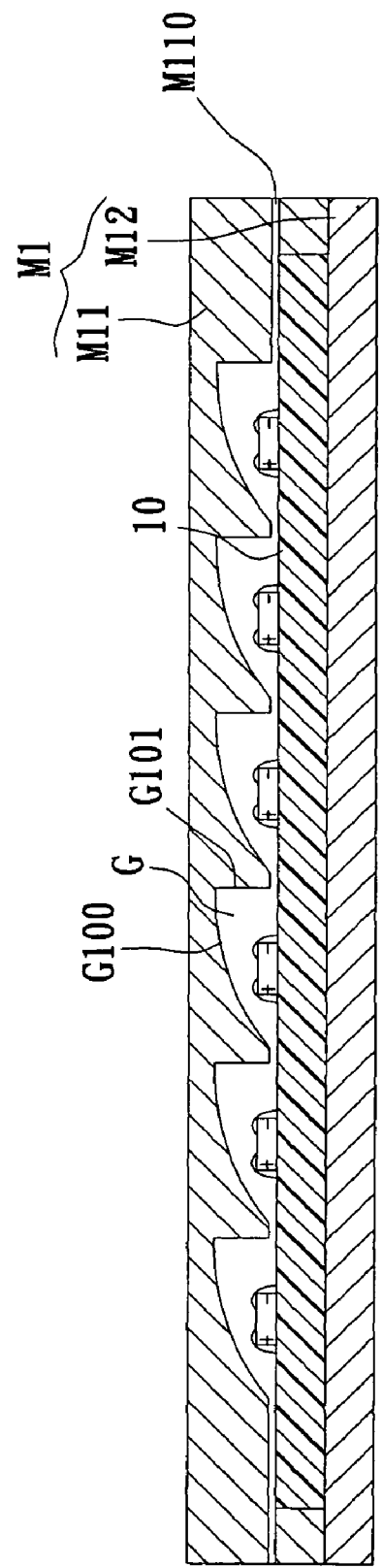
FIG. 5 is a schematic view of FIG. 3C without package colloid.

Referring to FIGS. 3c, 3C and 5, the method of the first embodiment further includes: longitudinally covering the transverse LED chip rows 2 with a package colloid 3 using a first mold unit M1, the package colloid 3 having a plurality of cambered colloid surfaces 300 that are formed on its top side and correspond to the transverse LED chip rows 2 and having a plurality of lateral colloid surfaces 301 respectively formed in front of the cambered colloid surfaces 300 (S104).

The first mold unit M1 is composed of a first upper mold M11 and a first lower mold M12 for supporting the substrate body 10. The first upper mold M11 has a first channel M110 that has a plurality of grooves G. Each groove G has a cambered mold surface G100 and a lateral mold surface G101 respectively formed on its top surface and a lateral surface thereof, and the cambered mold surface G100 is used to form the corresponding cambered colloid surface 300 and the lateral mold surface G101 is used to form the corresponding lateral colloid surface 301. Moreover, according to a user's needs, 11. the package colloid 3 can be a fluorescent resin that is formed by mixing silicon and fluorescent powders or is formed by mixing epoxy and fluorescent powders.

Figure 3D:
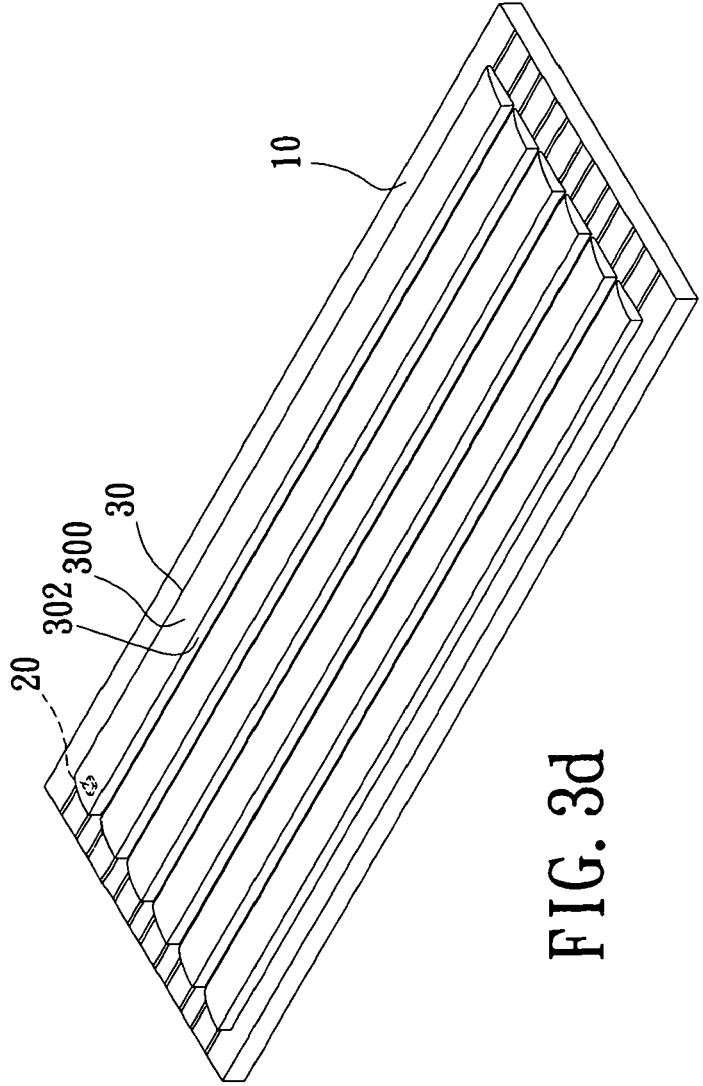
Figure 3D:
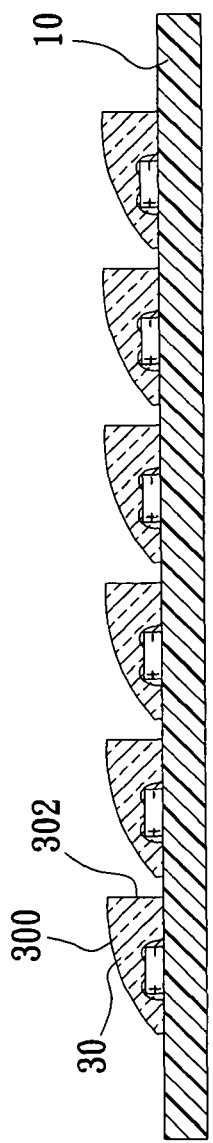

Referring to FIGS. 3d and 3D, the method of the first embodiment further includes: transversely cutting the package colloid 3 along a line between each two adjacent and longitudinal LED chips 20 to form a plurality of longitudinal package colloids 30 that are separated from each other and respectively covering the transverse LED chip rows 2, the top surface of each longitudinal package colloid 30 being the cambered colloid surface 300 and each longitudinal package colloid 300 having a light-emitting colloid surface 302 formed in front of its cambered colloid surface 300 (S106).

Figure 3E:
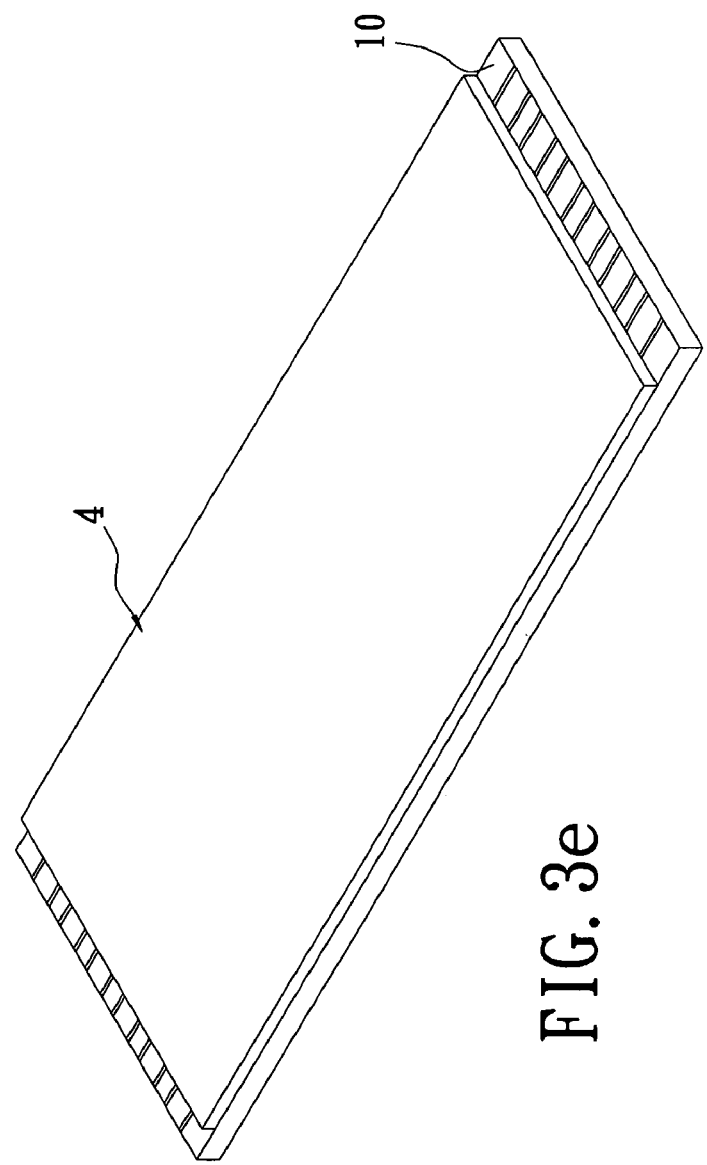
Figure 3E:
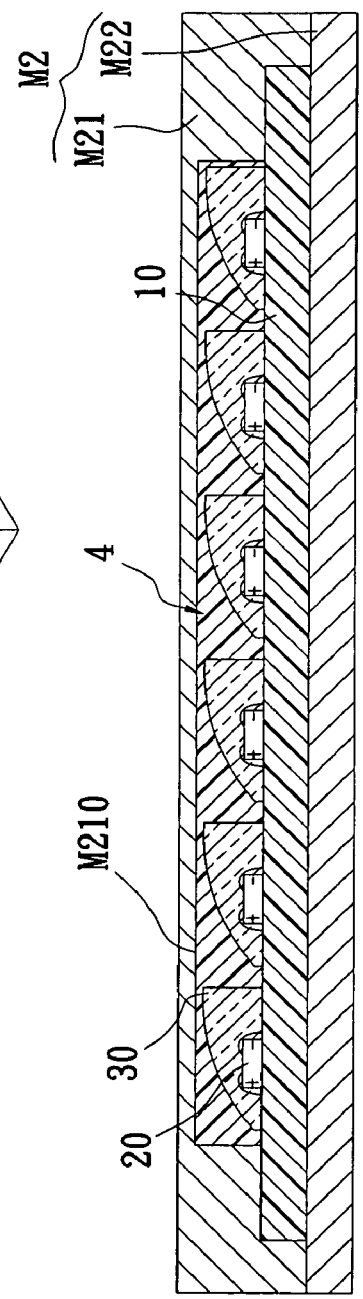

Referring to FIGS. 3e and 3E, the method of the first embodiment further includes: respectively covering and filling a frame unit 4 on the substrate body 10, on the longitudinal package colloids 30, and between each two adjacent longitudinal package colloids 30 using a second mold unit M2 (S108). Moreover, the second mold unit M2 is composed of a second upper mold M21 and a second lower mold M22 for supporting the substrate body 10. The second upper mold M21 has a second channel M210 corresponding to the frame unit 4. The size of the second channel M210 is the same as the size of the frame unit 4.

Figure 3F:
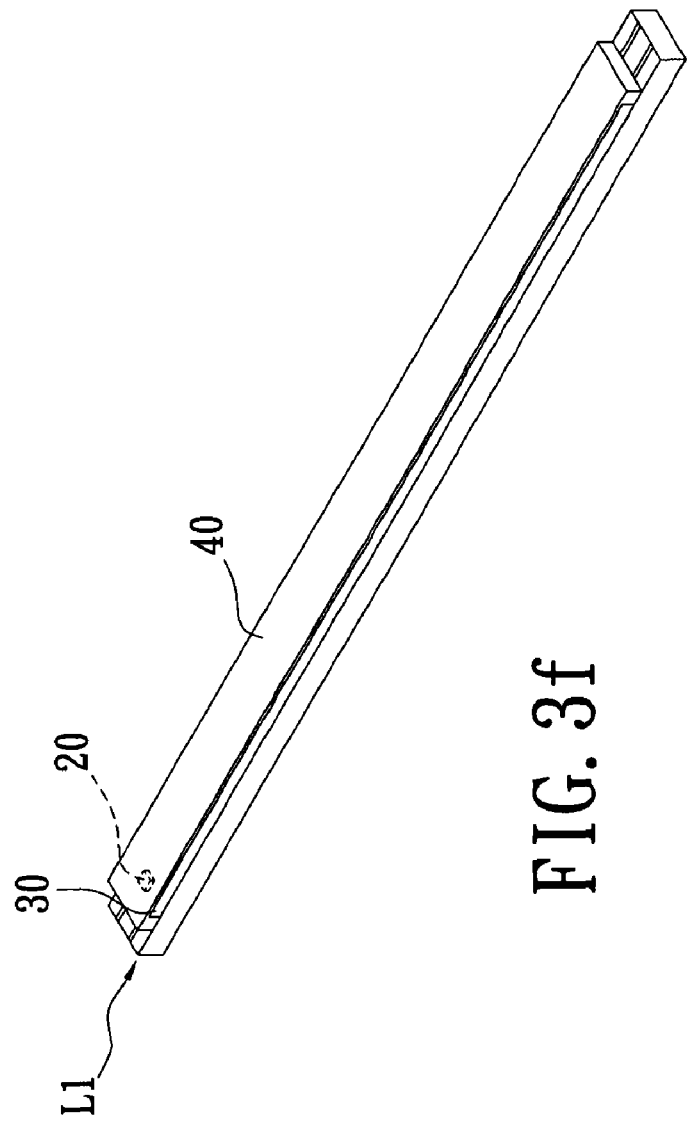
Figure 3F:
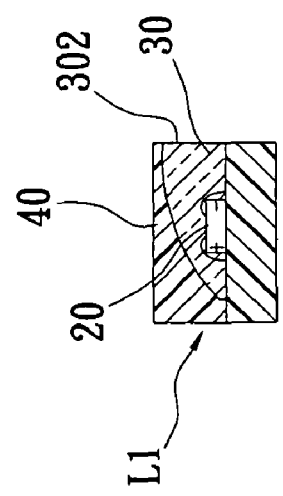
Figure 4:
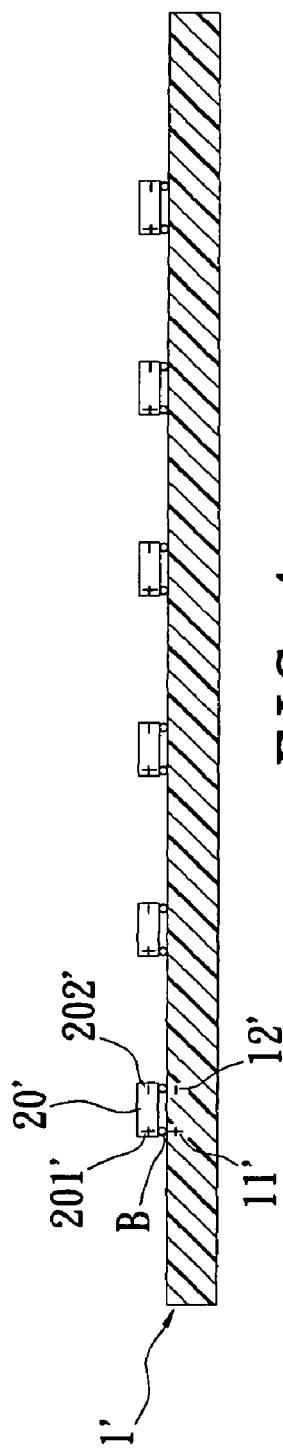
FIG. 4 is a schematic view of LED chips electrically connected on a substrate body via a flip-chip method.

Finally, referring to FIGS. 3e, 3f, and 3F, the method of the first embodiment further includes: transversely cutting the frame unit 4 and the substrate body 10 along the line between each two adjacent and longitudinal LED chips 20 to form a plurality of light bars L1, each light bar L1 having a frame layer 40 for exposing the light-emitting colloid surfaces 302 of the longitudinal package colloids 30. Moreover, the frame layer 40 can be an opaque frame layer such as a white frame layer.

Figure 6:
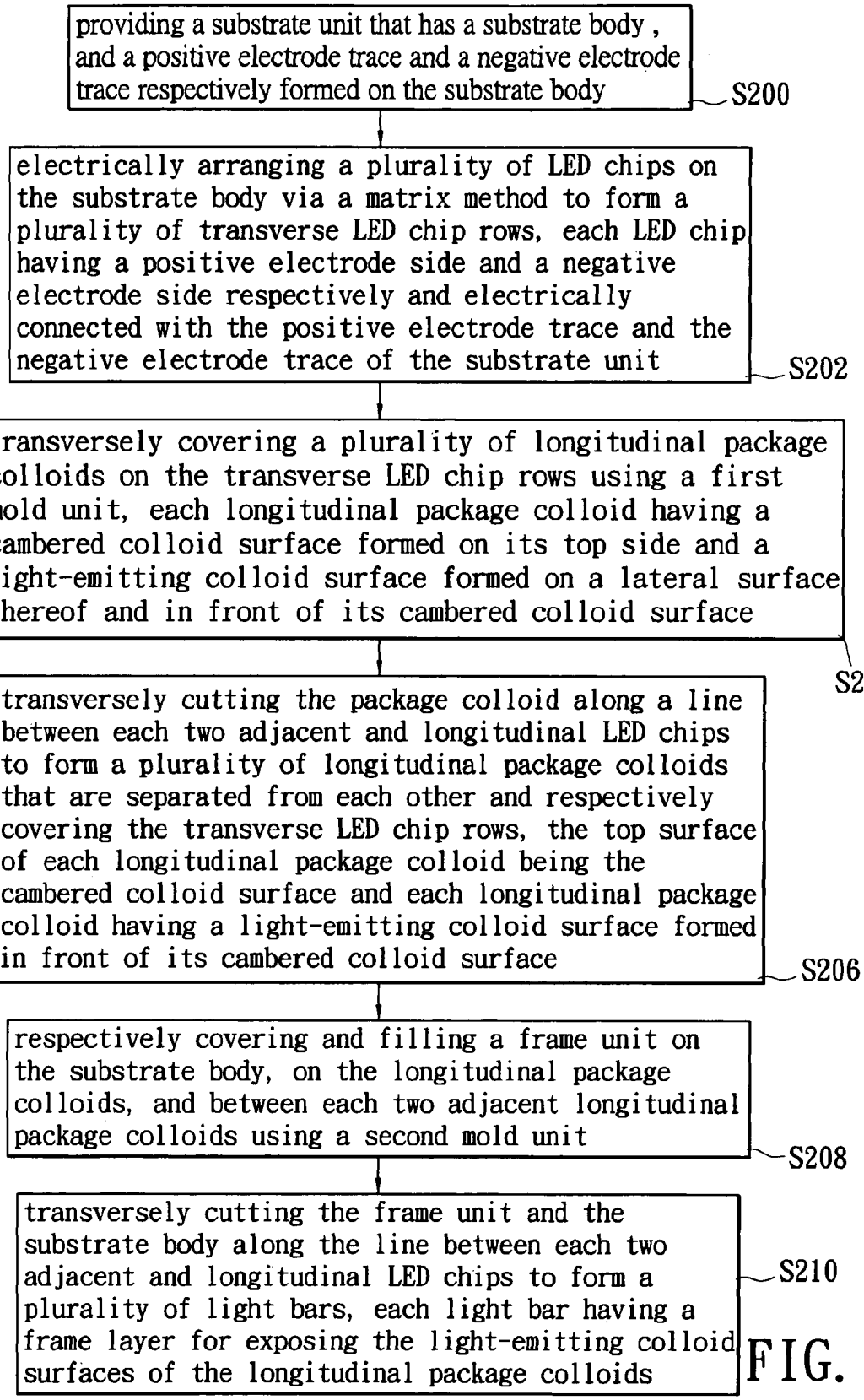
FIG. 6 is a flowchart of a method for making an LED chip package structure according to the second embodiment of present invention.
Figure 6A:
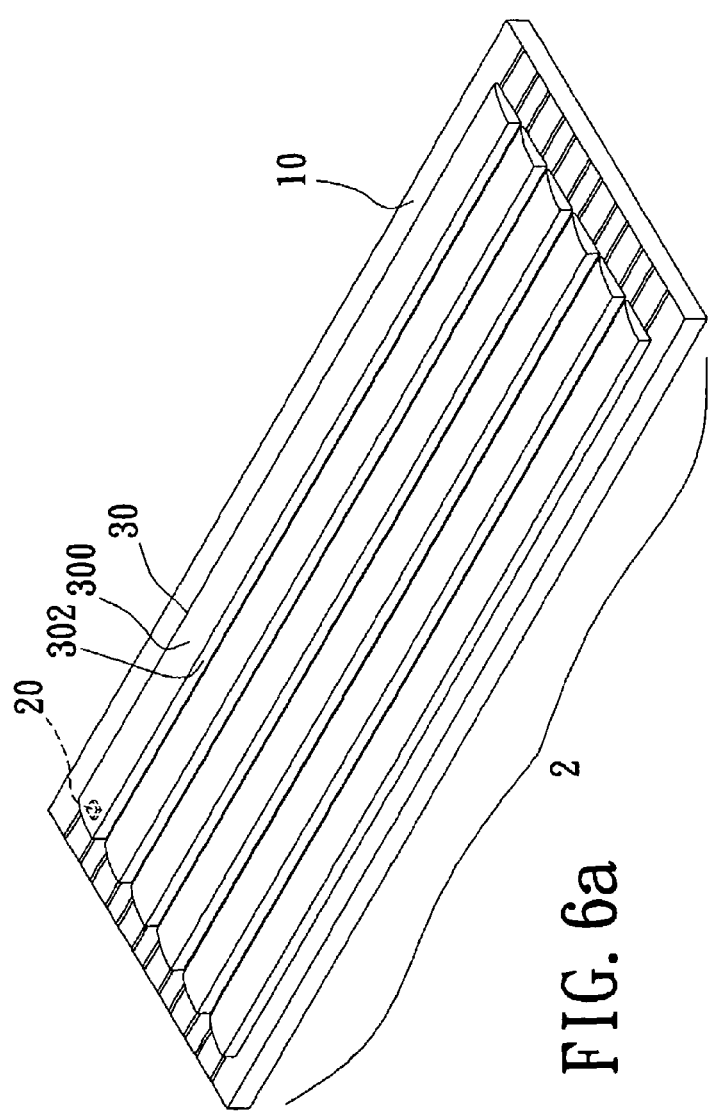
FIG. 6a is a partial, perspective, schematic diagrams of a making process according to the second embodiment of present invention.
Figure 6A:
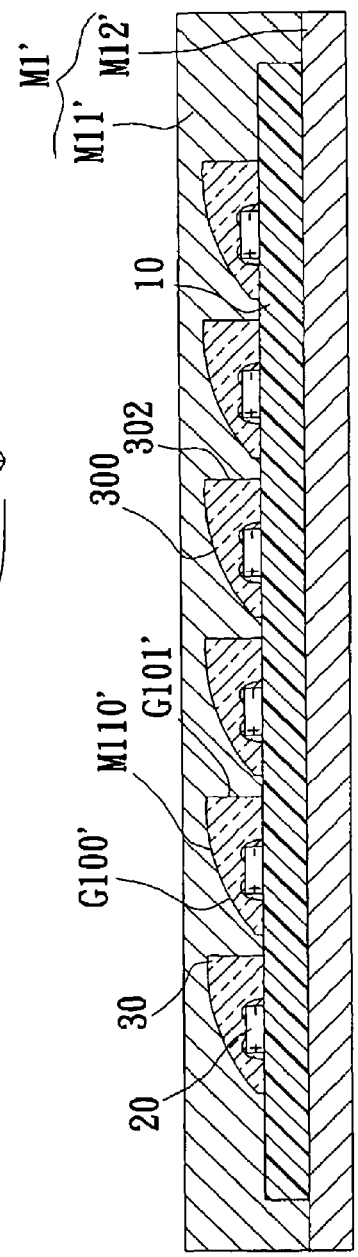

Referring to FIGS. 6, 6a and 6A, the second embodiment of the present invention provides a method for making an LED chip package structure with high-efficiency light-emitting effect. Referring to FIGS. 3 and 6, the steps S200 to S202 and S206 to S210 of the second embodiment are same to the steps S100 to S102 and S106 to S110 of the first embodiment. In other words, the illustration of S200 is the same to FIGS. 3a and 3A of the first embodiment, the illustration of S202 is the same to FIGS. 3b and 3B of the first embodiment, the illustration of S206 is the same to FIGS. 3d and 3D of the first embodiment, the illustration of S208 is the same to FIGS. 3e and 3E of the first embodiment, and the illustration of S210 is the same to FIGS. 3f and 3F of the first embodiment.

Between the steps of S202 and S206, referring to FIGS. 6a and 6A, the method of the second embodiment further includes: transversely covering a plurality of longitudinal package colloids 30 on the transverse LED chip rows 2 using a first mold unit M1', each longitudinal package colloid 30 having a cambered colloid surface 300 formed on its top side and a light-emitting colloid surface 302 formed on a lateral surface thereof and in front of its cambered colloid surface 300 (S204).

The first mold unit M1' is composed of a first upper M11' mold and a first lower mold M12' for supporting the substrate body 10. The first upper mold M11' has a plurality of first channels M110'. Each first channel M110' has a cambered mold surface G100' and a lateral mold surface G101' respectively formed on its top surface and a lateral surface thereof, and the cambered mold surface G100' is used to form the corresponding cambered colloid surface 300 and the lateral mold surface G101' corresponds to the corresponding light-emitting colloid surface 302. The size of each first channel M110' is the same as the size of each longitudinal package colloid 30.

Figure 7:
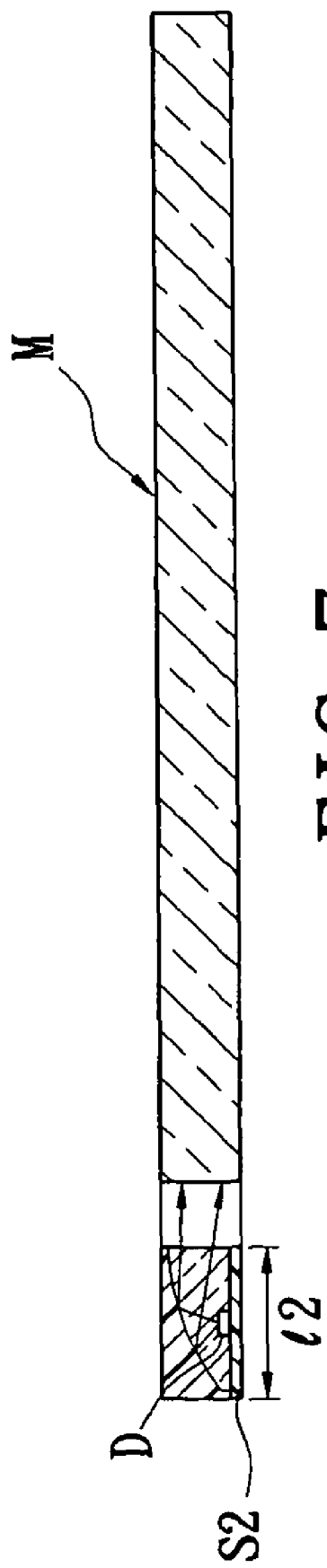
FIG. 7 is a schematic view of an LED chip package structure used to generate lateral projected light according to the present invention.

Referring to FIG. 7, when an LED chip D is used to generate lateral projected light as a lateral light source that is applied to a light-guiding board M of a monitor of a notebook, a length l2 of a base S2 can be increased according to heat-dissipation requirement (that is very different from the prior art). In other words, the length l2 of the base S2 can be increased, the LED chip D can get good heat-dissipating effect. Hence, the LED chip D can not be damaged easily due to overheat.

In conclusion, Therefore, because the series of light-generating areas is continuous, no dark bands are produced between each two LED chips and no light decay in the present invention. Furthermore, because the LED chips are arranged on a substrate body via an adhesive or a hot pressing method, the process for the LED chip package structure is simple and less time is needed for the manufacturing process. Moreover, the LED chip package structure of the present can be used in vertical state due to the special hot pressing method. Hence, the LED chip package structure of the present invention not only has a good heat-dissipating effect, but also can be applied to a thin casing.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An LED chip package structure with high-efficiency light-emitting effect, comprising:
   a substrate unit;
   a light-emitting unit comprising a plurality of LED chips electrically arranged on the substrate unit;
   a package colloid unit having a longitudinal package colloid for covering the LED chips, the longitudinal package colloid comprising a cambered colloid surface and a light-emitting colloid surface, wherein the colloid cambered surface is extended upwards and forwards over the substrate body and the light-emitting colloid surface is extended downwards from the colloid cambered surface toward the substrate unit; and
   a frame unit formed over the substrate body for covering the package colloid unit and allowing light emission in the direction of the colloid light-emitting surface of the package colloid unit.

2. The LED chip package structure as claimed in claim 1, wherein the substrate unit is a PCB, a flexible substrate, an aluminum substrate, a ceramic substrate, or a copper substrate.

3. The LED chip package structure as claimed in claim 1, wherein the substrate unit has a positive electrode trace and a negative electrode trace both formed on the substrate body.

4. The LED chip package structure as claimed in claim 1, wherein the substrate body has a metal layer and a Bakelite layer formed on the metal layer.

5. The LED chip package structure as claimed in claim 3, wherein both the positive electrode trace and the negative electrode trace are aluminum circuits or silver circuits.

6. The LED chip package structure as claimed in claim 3, wherein each LED chip has a positive electrode side and a negative electrode side respectively and electrically connected with the positive electrode trace and the negative electrode trace of the substrate unit.

7. The LED chip package structure as claimed in claim 6, wherein the positive electrode side and the negative electrode side of each LED chip are respectively and electrically connected with the positive electrode trace and the negative electrode trace of the substrate unit via two corresponding leading wires via a wire-bounding method.

8. The LED chip package structure as claimed in claim 6, wherein the positive electrode side and the negative electrode side of each LED chip are respectively and electrically connected with the positive electrode trace and the negative electrode trace of the substrate unit via a plurality of corresponding solder balls via a flip-chip method.

9. The LED chip package structure as claimed in claim 1, wherein the LED chips are straightly arranged on the substrate unit along a straight line.

10. The LED chip package structure as claimed in claim 1, wherein the LED chips are straightly arranged on the substrate unit along a plurality of straight lines.

11. The LED chip package structure as claimed in claim 1, wherein the longitudinal package colloid is a fluorescent resin that is formed by mixing silicon and fluorescent powders.

12. The LED chip package structure as claimed in claim 1, wherein the longitudinal package colloid is a fluorescent resin that is formed by mixing epoxy and fluorescent powders.

13. The LED chip package structure as claimed in claim 1, wherein the frame layer is an opaque frame layer.

14. The LED chip package structure as claimed in claim 13, wherein the opaque frame layer is a white frame layer.

* * * * *